Patented Aug. 4, 1931

1,817,183

UNITED STATES PATENT OFFICE

CLAYTON W. FARBER, OF BOWMANSTOWN, PENNSYLVANIA, ASSIGNOR TO THE NEW JERSEY ZINC COMPANY, OF NEW YORK, N. Y., A CORPORATION OF NEW JERSEY

MANUFACTURE OF LITHOPONE

No Drawing. Application filed May 19, 1927. Serial No. 192,789.

This invention relates to the manufacture of lithopone and has for its object the provision of certain improvements in lithopone manufacture.

Lithopone is a white pigment composed of zinc sulfide and barium sulfate. In the manufacture of lithopone, aqueous solutions of zinc sulfate ($ZnSO_4$) and barium sulfide (BaS) are mixed usually in about molecular proportions. Upon the mixing of these solutions there results a heavy, flocculent white precipitate consisting of an intimately associated admixture of zinc sulfide (ZnS) and barium sulfate ($BaSO_4$). The coprecipitate of zinc sulfide and barium sulfate is washed, filter-pressed and dried. The dried product is known in the industry as "crude lithopone". Crude lithopone is not suitable for paint purposes, but when it is heated, say to a temperature of 650–900° C., and suddenly cooled, by plunging (quenching) into cold water, its physical properties are so modified as to adapt it for paint purposes.

The present invention relates particularly to improvements in the precipitation of the crude lithopone, and aims to produce a crude lithopone precipitate of more uniform particle size than has heretofore been produced in commercial practice. The invention is based on certain discoveries that I have made in examining water suspensions of pigments under the microscope and will be best understood from the following discussion and description.

The opacity of a water suspension of zinc oxide pigment has been used as a measure of the particle size of the oxide and it has been shown (Stutz and Pfund, Jr. Ind. Eng. Chem. 19, p. 51, 1927) that there is a particle size, approximately 0.23 microns, at which zinc oxide has a maximum hiding power. The zinc oxide is suspended in water, with the aid of gum arabic and saponin as dispersing agents. When viewed in the microscope, fitted with dark-ground illumination, the suspension shows practically complete dispersion, with but very few secondary or aggregated particles. The grinding action given to the paste during the suspension process, as well as the efficiency of the dispersing agent, subject the pigment to dispersing conditions that are at least equally as severe, and probably much more severe, than those present in the grinding of pigments in paints, or their milling in rubber. It can, therefore, be assumed that the pigment will never show any greater degree of dispersion under any practical condition than it does in the water suspension.

When lithopone is suspended in water by this method and examined under the microscope, it shows certain peculiarities not shown by zinc oxide. The lithopone suspension contains several types of particles which may be designated as follows:

1. Primary or ultimate particles. These are single individual particles (that is, they cannot be detected as being made of more than one particle by this method of examination) that are estimated as being, usually about .20 micron in size.

2. Secondary or uniformly aggregated particles. These are small groups of primary particles usually containing from two to about eight primary particles. They appear to be firmly cemented or held together, and such an aggregated particle, when viewed in the microscope, appears brighter than any other type of particle.

3. Aggregates. These are large groups of primary particles, containing anywhere from about twenty to a thousand primary particles, held together somewhat loosely. These large aggregates are not broken up in the dispersing process. On long grinding in a pebble mill, or in a colloid mill, the number of these large aggregates decreases.

I have found that the present day commercial lithopones, when subjected to the foregoing examination, consist of a large number of primary particles and a wide range of secondary particles and aggregates. I have moreover found that the presence of a relatively large percentage of the secondary particles imparts to lithopone superior optical properties. Thus I have found that a lithopone containing a relatively large percentage of secondary particles, as compared with the number of primary particles and aggregates, possesses superior hiding power and brightness, and usually superior light resistance, as compared with a lithopone in which the secondary particles are present in relatively small numbers.

The marked increase in hiding power and brightness may be attributed in part to the uniformity in particle size of the lithopone in consequence of the large number of secondary particles present. But it is also evident that a lithopone, made up of single primary particles, uniform and of the size of the secondary particles, would not have this greatly superior hiding power and brightness. Therefore, uniformity does not completely explain the phenomenon. The other probable explanation is that the primary particles, which form the secondary particles, are held or cemented together in such a way that the spaces or voids separating the primary particles are filled with a material of either very low or very high refractive index. The former would seem to be more probable. Then, since the difference in the index of refraction of the pigment and this separating material is greater than the difference in index of refraction of the pigment and oil, the secondary particles will be more effective, as regards hiding power and brightness, than a number of primary particles separated by oil, or even water. The voids in the secondary particle may, for example, be filled with some gas, probably air, and the whole secondary particle covered with a film of material or so cemented together as to be impermeable to oil or water.

As I have already stated, the present day commercial lithopones are very non-uniform with respect to the relative percentages of primary particles, secondary particles and aggregates. Different samples of the same commercial brand and grade of lithopone frequently contain widely varying percentages of these different types of particles. The object of the investigation that resulted in my present invention was to discover the causes of this non-uniformity, and to produce under commercial conditions of manufacture a lithopone containing uniformly large percentages of secondary or uniformly aggregated particles.

As a result of my researches and investigations, I have discovered that the degree of agitation of the liquors during the precipitation of the crude lithopone has a most pronounced effect upon the effective particle size of the crude as well as the finished lithopone, and more particularly upon the relative percentages of primary particles, secondary particles and aggregates in the lithopone. In general, the more slow or gentle the agitation of the precipitating liquors the greater will be the number of secondary particles and the fewer the number of single primary particles.

My present invention accordingly involves, in one of its aspects, a control of the effective particle size of the crude and finished lithopone by appropriate regulation and control of the mixing of the liquors during the precipitation of the crude lithopone. In the precipitation of the crude lithopone, the solutions of zinc sulfate and barium sulfide are generally mixed in wooden tubs or tanks provided with mechanical stirring or agitating devices. It is the usual practice to introduce a predetermined quantity of the zinc sulfate solution or liquor into the precipitating tank and then to gradually add the barium sulfide solution or liquor with constant stirring and agitation of the mixed liquors, until tests show the desired reaction to have been completed. In accordance with my present invention, the zinc sulfate and barium sulfide solutions or liquors are mixed in the precipitating tank with the minimum degree of agitation required to effect intimate contact between the reacting liquors. This degree of agitation, characteristic of the invention is very substantially slower and more gentle than has heretofore been the practice in lithopone manufacture.

In the practice of the invention the reacting zinc sulfate and barium sulfide liquors are mixed with as little agitation as practicable. All stirring devices that violently agitate the precipitating liquors are carefully avoided. The precipitating liquors must be brought into intimate contact with one another in order that the desired reaction therebetween may be completed. For this reason, a certain degree of stirring, or equivalent method of mixing, must be employed in order to bring about the necessary contact between the two reacting liquors. In accordance with the invention, this stirring, or equivalent method of mixing, is conducted as gently as practicable and with the minimum agitation of the precipitating liquors.

Where the present invention is carried out in the heretofore customary types of precipitating tanks provided with rotatable stirring devices, the gentle mixing characteristic of the invention may be effected by revolving the stirrers at a substantially slower rate than has heretofore been the usual practice. Thus, for example, in the precipitation of the crude lithopone in a cylindrical tank approximately 15 feet in diameter and 7 feet deep, it has heretofore been the usual practice to rotate the stirring devices at about 25 R. P. M. In accordance with the principles of the present invention, the speed of rotation of these stirring devices is reduced to approximately 5 R. P. M., or lower.

The crude lithopone precipitated with the slow or gentle mixing characteristic of the invention is distinctly more uniform and larger in effective particle size and of a distinctly higher hiding power than the crude lithopone precipitated with the relatively fast or violent agitation heretofore customary in commercial lithopone manufacture. After calcination, the lithopone precipitated by the slow or gentle mixing of the invention is substantially free from colloidal-like particles and is composed in large part of secondary or uniformly aggregated particles made up of from two to eight individual primary particles.

I have further found that the temperature of the precipitating liquors, as well as the concentration of the zinc sulfate liquor, exercise an influence on the particle size of the crude lithopone and on the calcined lithopone. In general, the higher the temperature of the precipitating liquors and the higher the concentration of the zinc sulfate liquor, the more uniform in particle size is both the crude and calcined lithopone and the greater the number of secondary particles in those lithopones. Accordingly, it is my preferred practice to conduct the precipitating step while the reacting liquors are maintained at a temperature in excess of 75° C., and preferably about 80° C., or slightly higher, and to employ a zinc sulfate solution or liquor of relatively high concentration, approximately 40° to 50° Baumé.

The finished lithopone made from a crude lithopone precipitated under the improved conditions of the invention has superior brightness, hiding power and light resistance as compared with present day commercial lithopones. The superior properties of the lithopone made in accordance with the invention are, I believe, due in large part to its more uniform particle size, and more particularly to the presence of a relatively large number of uniformly aggregated secondary particles made up of from two to eight individual primary particles. As a consequnce of this preponderance of uniformly aggregated secondary particles, the crude lithopone precipitated in accordance with the principles of the invention has a wider range of muffling temperature than have the crude lithopones precipitated under the heretofore prevailing conditions of commercial practice.

I further believe that the decrease in the number of colloidal-like particles and the increase in the number of uniformly aggregated secondary particles in the lithopone manufactured in accordance with the invention results in a more uniform distribution of the zinc sulfide throughout the lithopone. Thus, I have found that substantially all of the zinc sulfide in the lithopone is attached to the barium sulfate particles. Such a condition tends to give the lithopone increased hiding power.

I claim:

1. In the manufacture of lithopone, the improvement in the precipitation of the crude lithopone which comprises mixing solutions of zinc sulfate and barium sulfide with such gentle stirring that the resulting crude lithopone precipitate contains uniformly aggregated particles composed of from two to eight individual particles in an amount greater than the amount of primary particles and aggregates composed of more than twenty particles.

2. In the manufacture of a lithopone, the improvement in the precipitation of the crude lithopone which comprises mixing a solution of zinc sulfate of from 40° to 50° Baumé and a solution of barium sulfide while maintained at a temperature in excess of 75° C. with such gentle stirring that the resulting crude lithopone precipitate contains uniformly aggregated particles composed of from two to eight individual particles in an amount greater than the amount of primary particles and aggregates composed of more than twenty particles.

3. In the manufacture of lithopone, the improvement in the precipitation of the crude lithopone which comprises mixing solutions of zinc sulfate and barium sulfide with a degree of agitation substantially equivalent to that obtained when employing a tank fifteen feet in diameter and seven feet deep having a conventional stirring device that is rotated at a speed of not more than about five revolutions per minute, whereby there is produced a crude lithopone precipitate containing uniformly aggregated particles composed of from two to eight individual particles in an amount greater than the amount of primary particles and aggregates composed of more than twenty particles.

In testimony whereof I affix my signature.

CLAYTON W. FARBER.